United States Patent Office 3,209,698
Patented Oct. 5, 1965

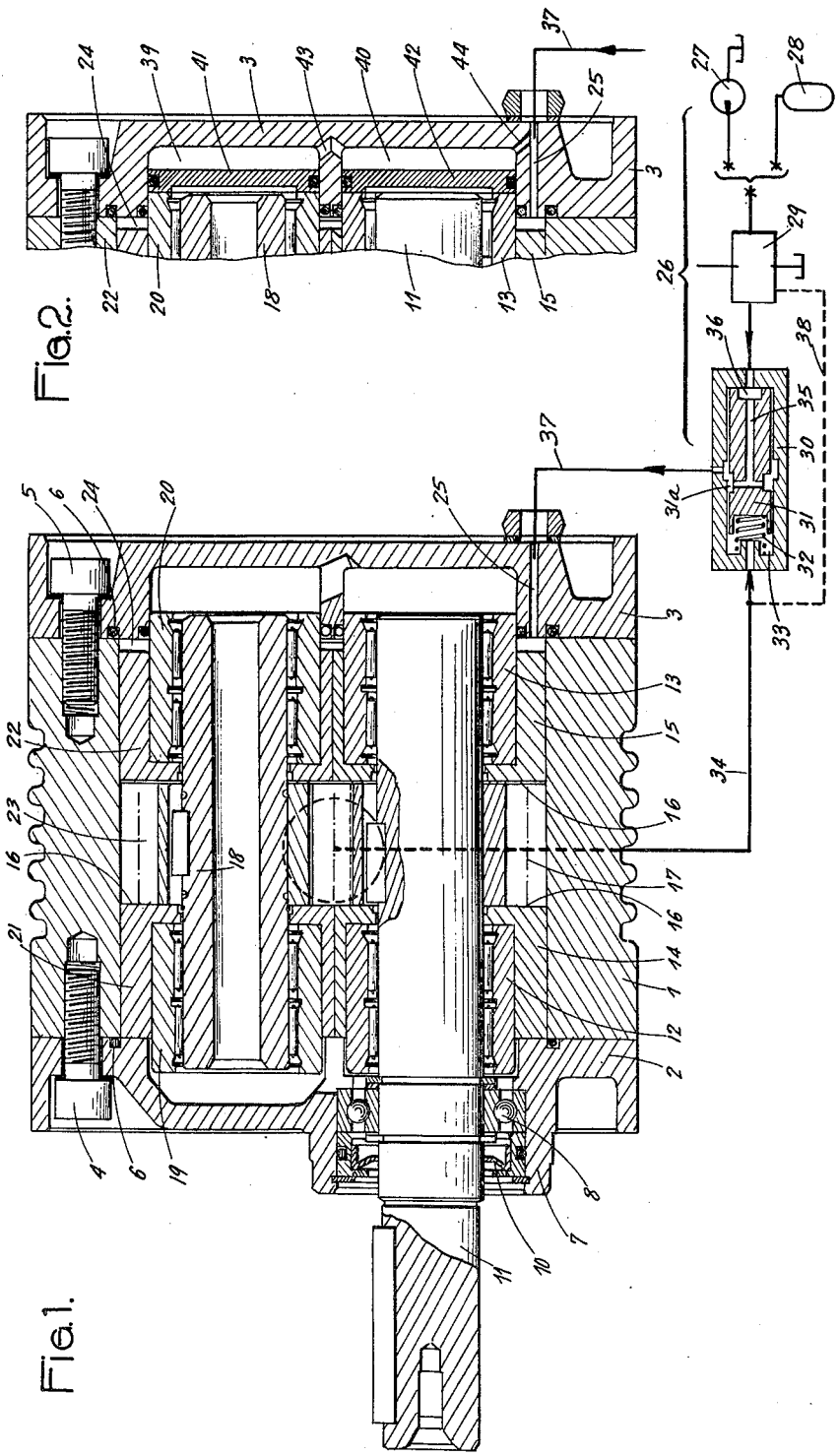

3,209,698
METHOD OF REGULATING A HYDRAULIC POWER TRANSFORMER AND DEVICE PUTTING THIS INTO OPERATION
Roger Laumont, Nogent-sur-Marne, Seine, France, assignor to Hydro-Meca, Paris, France, a company of France
Filed July 26, 1962, Ser. No. 212,560
Claims priority, application France, Sept. 4, 1961, 872,287, Patent 1,306,674
3 Claims. (Cl. 103—120)

The present invention relates to a method of regulating hydraulic power transformers, that is to say, a method of regulating appliances that can operate either as a pump or as a double rotation direction motor.

The invention also applies to a device for putting this method into operation, this device being most particularly intended to be used in fixed or movable equipment comprising several hydraulic pumps or hydraulic motors coupled together, whose respective drive must be ensured in a selective manner, in particular for varying the delivery of a pump group or the pressure set up by this pump group, as well as eventually for varying either the rotation speed of a shaft, or the torque applied to this shaft, and this without sudden stoppages occurring both in the variation of the delivery as well as in the speed variation or torque.

According to the invention, the regulating method for a hydraulically operated power transformer, able to work either as a pump or motor, in one or other rotation direction, is characterized in that the components for converting power are formed by rotative elements placed in an enclosure having at least one mobile lateral wall in relation to said rotative elements, said wall being brought close to or retracted from said rotative elements by subjecting it to a variable pressure controlled independently of the pressures set up in the working circuit of the transformer.

According to one embodiment of the device of the invention, this device comprises a rotor whose lateral faces are placed in two parallel planes, this rotor being mounted between two plane bearings, of which at least one is axially movable and projects into a chamber connected to a controlling component setting up a controlled variable pressure in said chamber.

Various other characteristics of the invention will moreover be revealed by the detailed description which follows.

Forms of embodiment of the device according to the invention are shown by way of non-restrictive examples, in the attached drawing.

FIG. 1 is an elevation-section of the hydraulic power transformer according to the invention.

FIG. 2 is a partial section similar to FIG. 1 showing an alternative embodiment.

According to the drawing, the power transformer shown may be used immaterially as a hydraulic pump or a motor with an immaterial rotation direction.

In the form shown, it comprises a casing 1 closed at both ends by cheeks 2 and 3 which are attached to said casing, for example, by means of screws 4 and 5; sealing joints 6 are also provided between said casing and the cheeks, so as to prevent any liquid leakage, and also eventually, any air entering inside said casing. The cheek 2 forms a supporting sleeve 7 for a bearing 8 associated with a seal 10 and in which a shaft 11 is mounted, which, when the power transformer is a pump, forms the driving shaft, whereas, when said transformer operates as a motor, said shaft 11 forms the driven element. The shaft 11 is moreover, placed in bearings 12, 13 of the needle type in the example shown, whose cages are themselves placed inside bushings 14 and 15, each having a lateral plane face 16 intended to act as a thrust bearing surface for a pinion 17 keyed on to the shaft 11.

18 denotes a second shaft placed parallel to the shaft 11, and mounted, like the latter, in bearings 19 and 20, themselves placed inside bushings 21, 22 each having respectively a plane face 16 acting as lateral bearing surface for a pinion 23 keyed on said shaft 18 and engaged with the pinion 17. The bushings 14, 15 on the one hand, and 21, 22 on the other, are mounted floating, that is to say, they are able to slide, to a certain extent, at least, in relation to their respective shaft, and also the length of the space provided between the two closing cheeks of the casing is slightly greater than the sum of the lengths of the bushings plus the length of the pinions. In this manner, considering that the bushings 14 and 21 are bearing against the cheek 2, a chamber 24 is delimited between the ends of the bushings 15 and 22 and the cheek 3. The width of this chamber is variable, seeing that the bushings are floatably mounted, and it follows that, when the width of this chamber is reduced, there is necessarily a space produced between the lateral faces, of the pinions 17 and 23 and the corresponding bearing faces of the bushings 14, 21 on the one hand, and 15, 22 on the other.

In the example shown, the chamber 24 is common to the two bushings 15 and 22, so that, if so required, each bushing can be placed in an independent chamber.

This chamber 24 communicates, by a duct 25, with a control unit, denoted as a whole by the reference numeral 26. Unit 26 is intended to cause variation of the pressure of a fluid admitted into the chamber 24 so that the bearings 16 of the bushings can, if so required, exert on the lateral faces of the pinions 17 and 23, a variable pressure that can be equivalent to the delivery pressure of the pump, in the case of a transformer working as a pump, or equivalent to the inlet pressure of the motor, if this transformer is used as a motor. The control pressure may be set up lower than said delivery or inlet pressure, and also may be made nil if so required in the case, more particularly, where it is considered desirable that the power transformer should be made ineffective in a hydraulic unit in which it works and to which it is mechanically subject.

In the arrangement shown, the controlling unit comprises a driving or piloting element, which is connected to a regulating distributor 29 which can take various forms but makes possible the regulating of the pressure set up by one or other of the pilot components 27 or 28, formed, in the example shown, respectively by a pump and by a hydraulic accumulator.

The regulating distributor forming the servo-control is connected to a safety valve which is formed by a hollow body 30 containing a slide 31 biased by a spring 32 placed in a chamber 33 which is connected, by a duct 34, to the delivery duct of the pump or motor inlet. The slide 31 also has a groove 31a isolated from the chamber 33, but connected by ducts 35 to a chamber 36 which communicates with the outlet of the servo-control device 29. The position of the groove 31a is determined so as to establish a communication through a duct 37 between the channels 35 and the channel 25 leading to the chamber 24 of the power transformer. On the other hand, this communication is interrupted when the slide is moved, to the left of the drawing, against the action of the spring 32, which occurs when the pressure coming from the servo-control device 29 exceeds the delivery pressure of the pump or the inlet of the motor.

This device 26 is thus intended to prevent an excessive pressure being accidentally set up in the chamber 24, which might cause—when the pressure is too low in the working circuit of the power transformer—damage to the bushings which would thus be held too tightly against the pinions. In normal working, the safety valve 30 does not come into action, as a by pass circuit 38 is advantageously provided connecting the servo-control device 29 to the high pressure of the power transformer, which thus ensures an additional piloting to this servo-control device in the event of an abnormal lowering of the high pressure inside the working circuit of the power transformer.

As will be seen from the foregoing, when the servo-control device 29 is closed, no pressure is set up in the chamber 24, and consequently, the pinions 17 and 23 may be rotatively driven without any power absorption resulting therefrom in as much as the inlet and outlet ducts of the power transformer are directly connected by the space existing, at that moment, between the pinions and the bearings of the bushings. It then becomes possible, in an equipment comprising several pumps or motors driven simultaneously, to isolate certain of these motors or pumps, to render them inactive, simply by cancelling out the pressure in the respective chambers 24, which, more particularly, enables variable delivery units to be formed. Moreover, by progressively increasing the pressure in the chamber 24, the bushings are also progressively increasing the pressure in the chamber 24, the bushings are also progressively brought nearer to the pinions, and consequently, the leakage circuit which had been established is thus progressively eliminated, which enables, by these very simple means, a progressive elevation of the rotation speed of the shaft 11, if the latter is a driven shaft, or on the other hand, a progressive increase in delivery if the shaft 11 is a driving shaft.

We thus see that we can obtain, in a particularly simple manner, either a clutch mechanism or a braking mechanism.

It is obvious that the pressure that must be set up in the chamber 24 must be determined as a function of the effective surface of the part of the bushings 13 and 22 projecting in this chamber. When the effective surface of this part of the bushings is smaller than the surface of the bushings on which is exerted the high pressure set up in the working circuit of the power transformer, it may become necessary to set up, in said chamber 24, an absolute pressure exceeding the high pressure prevailing in said working circuit. This consequently calls for the utilizing of a pilot pump 27 which can be relatively high pressure. To obviate this disadvantage, we may proceed as shown in FIG. 2, according to which the cheek 3 delimits cylinders 39 and 40 in which pistons 41 and 42 are placed, bearing against the terminal part of the cages of the bearings 13 and 20. The two cylinders 39 and 40 may be in communication with each other by a channel 43, as shown, or on the contrary, isolated from each other. Also, in the example shown, the cylinders 39 and 40 communicate by a channel 44 with the channel 25 leading to the safety valve 30, so that the pressure coming from the servo-control mechanism 29 is, in this way, applied, on the one hand, directly to the bushings 15 and 22, and on the other, indirectly to these bushings through the cages of the bearings 13 and 20 and also by means of the pistons 41 and 42. Seeing that the surface on which the control pressure is exerted may, in this manner, be considerably increased, it becomes possible to utilize only relatively low control pressures, and in particular, the control pressure may be stored in a hydro-pneumatic accumulator periodically replenished by putting it into communication, either by hand or automatically with the high pressure of the working circuit of the power transformer.

When the cylinders 39 and 40 are isolated from each other, it is possible to vary the pressure exerted on each of the pistons 41 and 42, more particularly according to the manner in which the power transformer works and the pressure admitted into these cylinders may also be a pressure different to that that is made to act directly in the chamber 24 on the bushings 15 and 22. It is thus possible more particularly to make the low pressure of the working circuit of the transformer to act on the pistons 41, 42 and to pilot this transformer by acting on the pressure applied in the chamber 24.

I claim:

1. A hydraulic device of the character described, comprising, a casing, rotatable meshing pinions in the casing, shafts carrying said pinions in the casing, one of said shafts protruding outside of the casing for transmission of power to and from the pinions, bushings and bearings rotatably carrying said shafts and pinions in the casing, said bushings being free-floating and having end flanges to delimit a cavity wherein said pinions rotate, said flanges being able to bear against ends of the pinions to form pressure seals thereat, inlet and outlet ports in the casing communicating with said cavity and separated from each other by said pinions, said ports serving to pass liquid under pressure to and from the pinions, the liquid pressure in each port being different and depending on the direction in which the liquid is passed through the ports as the meshed pinions and the shafts rotate, the bushings at one end of said pinions being freely and slidably mounted and having portions defining with said casing a pressure chamber, a source of liquid under pressure connected to said pressure chamber, and controllable pressure regulating means connected between said source and said pressure chamber, said pressure regulating means selectively controlling the pressure applied to said pressure chamber between a maximum value in excess of that in said cavity, at which the bushing and flanges are in firm sealing contact with the ends of said pinions, and a minimum value at which the bushing and flanges are retracted from the ends of said pinions to define a by-pass between said inlet and outlet ports.

2. A hydraulic device of the character described comprising, a casing, rotatable meshing pinions in the casing, shafts carrying said pinions in the casing, one of said shafts protruding outside of the casing for transmission of power to and from the pinions, bushings and bearings rotatably carrying said shafts and pinions in the casing, said bushings being free-floating and having end flanges to delimit a cavity wherein said pinions rotate, said flanges being able to bear against ends of the pinions to form pressure seals thereat, inlet and outlet ports in the casing communicating with said cavity and separated from each other by said pinions, said ports serving to pass liquid under pressure to and from the pinions, the liquid pressure in each port being different and depending on the direction in which the liquid is passed through the ports as the meshed pinions and the shafts rotate, the bushings at one end of said pinions being freely and slidably mounted and having portions defining with said casing a first pressure chamber, at least one slidable piston structure in the casing defining with said casing a second pressure chamber, said piston structure being in contact with the slidable bushing, said second chamber communicating with said first chamber for applying to the piston structure the pressure prevailing in the first chamber, a source of liquid under pressure connected to said first chamber, and controllable pressure regulating means connected between said source and said first chamber, said pressure regulating means selectively controlling the pressure applied to said first chamber and said second chambers between a maximum value which is in excess of that in said cavity, at which the bushing and flanges are in firm sealing contact with the ends of said pinions, and a minimum value at which the bushing and flanges are retracted from the ends of said pinions to define a by-pass between said inlet and outlet ports.

3. A hydraulic device comprising a casing, rotatable meshing pinions in the casing, shafts carrying said pinions in the casing, one of said shafts protruding outside of the casing for transmission of power to and from the pinions, bushings and bearings rotatably carrying said shafts and pinions in the casing, said bushings having end flanges to delimit a cavity wherein said pinions rotate, said flanges being able to bear against ends of the pinions to form pressure seals thereat, inlet and outlet ports in the casing communicating with said cavity and separated from each other by said pinions, said ports serving to pass liquid under pressure to and from the pinions, the liquid pressure in each port being different and depending on the direction in which the liquid is passed through the ports as the meshed pinions and the shafts rotate, the bushings at one end of said pinions being freely and slidably mounted and having portions defining with said casing a pressure chamber, a source of liquid under pressure connected to said pressure chamber, and controllable pressure regulating means connected between said source and said pressure chamber, said pressure regulating means selectively controlling the pressure applied to said pressure chamber between a maximum value in excess of that in said cavity, at which the bushing and flanges are in firm sealing contact with the ends of said pinions, and a minimum value at which the bushing and flanges are retracted from the ends of said pinions to define a by-pass between said inlet and outlet and wherein there is included a safety valve interposed between said pressure regulating means and said pressure chamber, said safety valve including a casing having a first inlet connected to said pressure regulating means, an outlet connected to said pressure chamber, and a second inlet connected to the high pressure side of said cavity, a slide movably mounted in said casing and subjected, at opposite ends, to the respective inlet pressures thereof, said slide being formed with port means normally connecting said first inlet to said outlet to supply pressure from said pressure regulating means to said pressure chamber, said slide, when the pressure of said pressure regulating means exceeds the pressure on the high side of said cavity by a predetermined amount, moving to a position interrupting connection of said pressure regulating means to said pressure chamber.

References Cited by the Examiner

UNITED STATES PATENTS

| | | | |
|---|---|---|---|
| 2,444,165 | 6/48 | Lauck | 103—126 |
| 2,627,232 | 2/53 | Lauck | 103—126 |
| 2,654,325 | 10/53 | Minshall | 103—126 |
| 2,867,174 | 1/59 | Campbell et al. | 103—126 |
| 2,915,977 | 12/59 | Campbell | 103—120 |
| 2,993,450 | 7/61 | Weigert | 103—126 |
| 3,008,426 | 11/61 | Edwards et al. | 103—126 |

DONLEY J. STOCKING, *Primary Examiner.*

LAURENCE V. EFNER, JOSEPH H. BRANSON, JR., KARL J. ALBRECHT, *Examiners.*